United States Patent [19]

Ling

[11] 4,199,047
[45] Apr. 22, 1980

[54] HYDROKINETIC TORQUE CONVERTER WITH LOCK-UP CLUTCH

[75] Inventor: Ching-Chung Ling, Plymouth, Mich.

[73] Assignee: Ford Motor Company, Dearborn, Mich.

[21] Appl. No.: 849,723

[22] Filed: Nov. 9, 1977

[51] Int. Cl.² .................. F16H 47/00; F16D 33/00; F16D 13/72
[52] U.S. Cl. .................. 192/3.3; 192/70.12; 74/645; 60/435
[58] Field of Search .............. 192/3.3, 3.29, 3.28, 192/3.31, 70.12, 3.32, 3.33; 74/645; 60/435, 361, 362, 364, 366

[56] References Cited

U.S. PATENT DOCUMENTS

| | | | |
|---|---|---|---|
| 3,002,593 | 10/1961 | Black et al. .................. | 192/3.29 |
| 4,033,436 | 7/1977 | Hoetger et al. .................. | 192/3.3 |
| 4,044,556 | 8/1977 | Kuramochi et al. .................. | 192/3.28 |
| 4,056,177 | 11/1977 | Ahlen et al. .................. | 192/3.3 |
| 4,071,125 | 1/1978 | Jameson .................. | 192/3.3 |
| 4,090,417 | 5/1978 | Burcz et al. .................. | 192/3.3 |
| 4,091,899 | 5/1978 | Stevenson .................. | 192/3.3 |
| 4,143,561 | 3/1979 | Melhorn .................. | 74/645 |

*Primary Examiner*—Benjamin Wyche
*Assistant Examiner*—David C. Reichard
*Attorney, Agent, or Firm*—Donald J. Harrington; Keith L. Zerschling

[57] ABSTRACT

A hydrokinetic torque converter with an internal friction clutch wherein provision is made for actuating the clutch in response to changes in hydrokinetic torus circuit pressure and wherein provision also is made for engaging and disengaging the clutch by controlling the direction of fluid flow to and from the torus circuit of the converter.

6 Claims, 3 Drawing Figures

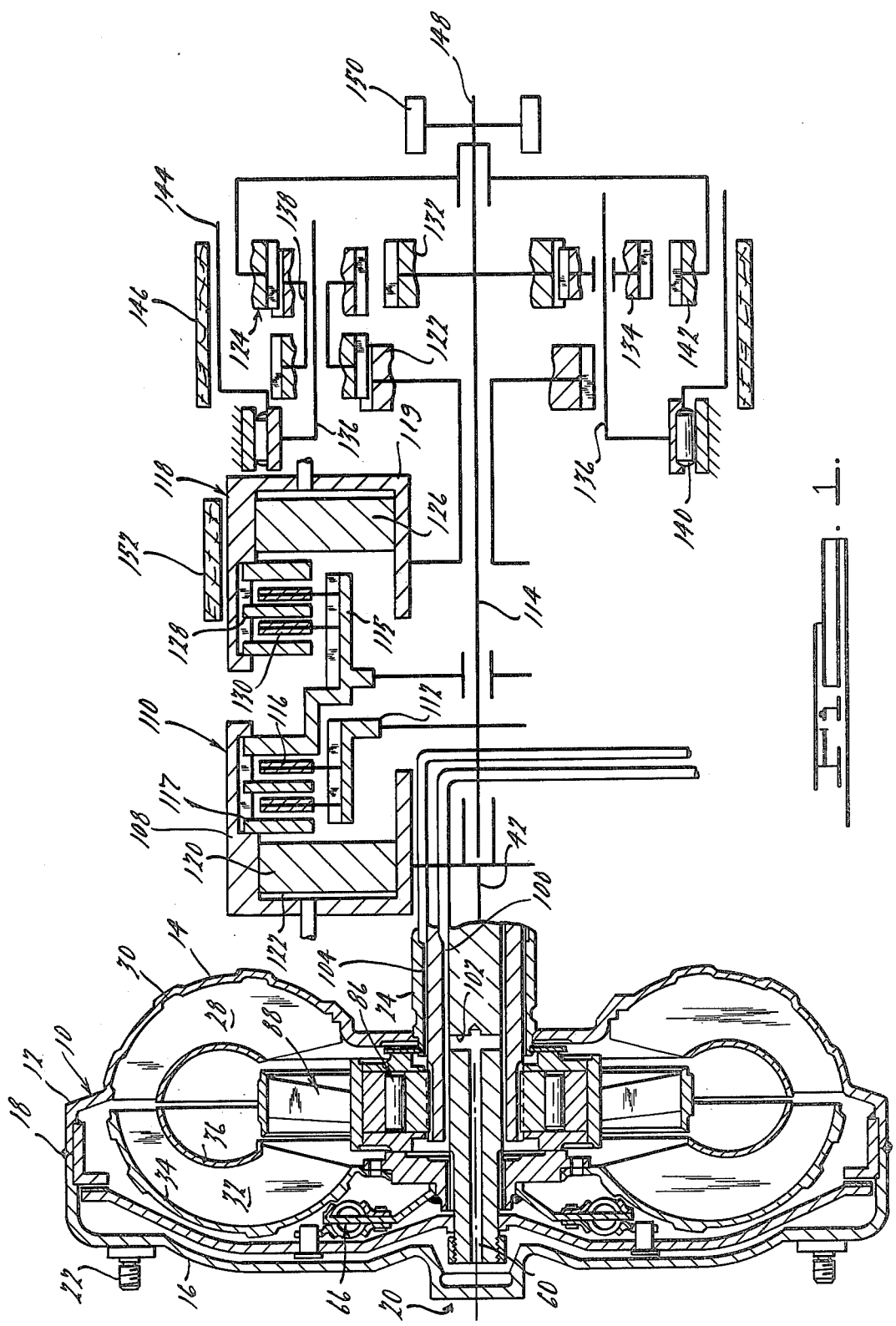

HYDROKINETIC TORQUE CONVERTER WITH LOCK-UP CLUTCH

BRIEF DESCRIPTION OF THE INVENTION

My invention relates to an improvement in a hydrokinetic torque converter having a bladed impeller, a bladed turbine and bladed stator arranged in toroidal fluid flow relationship. The improvement comprises an internal friction clutch located in the impeller housing for the converter which is effective when engaged to lock the turbine and the impeller for rotation in unison thereby providing a positive mechanical drive between a power input element and a power output element, the latter being used as a torque input member for a multiple ratio gear system.

The improvement of my invention is adapted for use in an automotive vehicle power transmission mechanism. The transmission is capable of torque delivery with multiple paths, each of which has a different ratio. Hydrokinetic losses in the converter can be reduced and substantially eliminated during cruising operation of the vehicle with the gear system in a direct drive condition by engaging the internal clutch of the hydrokinetic torque converter.

I am aware of prior art lock-up clutch designs, such as those shown in U.S. Pat. Nos. 3,252,352; 3,972,397; 3,734,251; 3,638,771; 3,235,037; 3,541,893 and 3,001,115. Each of these references discloses a friction member for locking up the turbine and the impeller in a hydrokinetic torque converter. The disclosure of U.S. Pat. No. 3,252,352, unlike the other disclosures mentioned here, includes an internal clutch that is engaged by using circuit pressure in the hydrokinetic unit. My present disclosure differs from the disclosure of U.S. Pat. No. 3,252,352 by a novel arrangement of the elements of the lock-up clutch that makes possible a flow of working fluid through the hydrokinetic torque circuit of the converter from a radial inward point to a radial outward point during normal operation of the converter thereby providing increased flow through the hydrokinetic circuit and increasing the cooling capacity of the unit.

When the hydrokinetic unit is acting as a fluid coupling or a torque converter, heat is generated because of the fact that the converter is operating at a speed differential less than unity. The heat buildup in the working fluid of the converter represents power loss in a lock-up converter shown in U.S. Pat. No. 3,252,352. The cooling fluid must work against a dynamic pressure head developed by reason of rotation of the impeller unit, and under some operating conditions adequate cooling cannot be achieved unless the cooling fluid pump for the hydrokinetic fluid is modified to provide an increased flow capacity. An increased pump capacity, however, causes a further undesirable horsepower loss.

The improvements of my invention make it possible to use a relatively small pump for circulating hydrokinetic fluid through the working circuit of the converter while achieving maximum flow and providing adequate cooling for the converter under all operating conditions. It also prevents a tendency for the clutch to "drift-on" upon a build-up of dynamic pressure in the torus circuit. Unlike the clutch of U.S. Pat. No. 3,252,352, unscheduled clutch engagement is prevented because the dynamic pressure generated in the torus circuit tends to urge the clutch to a disengaged position rather than an engaged position.

BRIEF DESCRIPTION OF THE FIGURES OF THE DRAWINGS

FIG. 1 shows in schematic form a power transmission mechanism including an improved torque converter of my invention in combination with a multiple ratio gear system in an automotive vehicle driveline.

PARTICULAR DESCRIPTION OF THE INVENTION

Figure 2A:
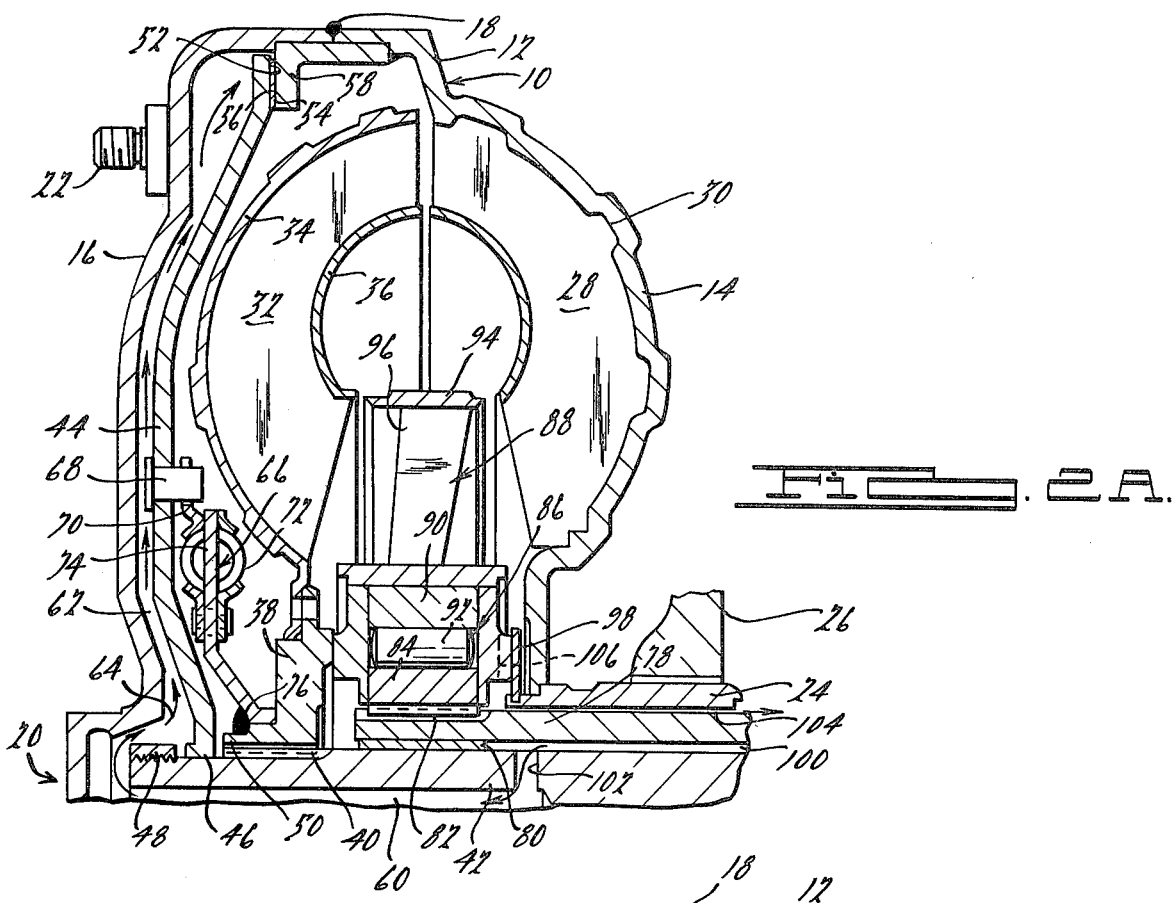
FIG. 2A is an enlarged view of the hydrokinetic torque converter of FIG. 1 with the internal lock-up clutch in an engaged condition.

In FIG. 1 numeral 10 designates generally a hydrokinetic torque converter to which the improvement of my invention may be applied. Converter 10 includes an impeller shell 12 having a semi-toroidal section 14 and an end plate 16 that are joined by welding 18 on the periphery. The converter 10 is adapted to rotate about its geometric axis indicated by reference numeral 20. Threaded drive studs 22 are secured to the outer region of the wall 16 to permit a driving connection between a flexible flywheel that may be drivably connected to the crankshaft of an internal combustion engine in an automotive vehicle driveline. The impeller 12 has a hub 24 that is adapted to be journalled in the end wall or bearing support of the transmission housing, a part of which is shown at 26.

The impeller includes radial outflow directing blades 28 that are secured to the inner wall of semi-toroidal shell portion 14 by retaining tabs 30. The impeller is situated in toroidal fluid-flow relationship with respect to radial inflow directing turbine blades 32. The turbine comprises an outer shroud 34 and an inner shroud 36 which cooperate with the blades 32 to define the turbine inflow passages.

The radial inward margin of the outer shroud 34 is connected to turbine hub 38 which is splined at 40 to turbine shaft 42.

A clutch disc 44 is situated between the impeller wall 16 and the turbine shroud 34. It extends generally in a radial direction and is supported or piloted at its hub 46 on turbine shaft 42. A retainer nut 48 threaded on the end of shaft 42 limits axial shifting movement of the clutch disc 44 in one direction. Movement in the opposite direction is limited by stop 50 formed on turbine hub 38. The spacing between the nut 48 and the stop 50 is such that a limited amount of shifting movement of the clutch disc 44 is permitted.

The outer margin 52 of the clutch disc 44 carries a friction disc 54 which is situated adjacent in juxtaposed relationship with respect to friction surface 56 formed on clutch reaction on ring 58, the latter being welded or otherwise secured to the inner wall of the impeller shell at the periphery of the shell members 12 and 16.

Turbine shaft 42 has a central opening 60 through which converter fluid may be distributed to the space 62 between the impeller shell wall 16 and the clutch disc 44. The directional flow is indicated by the directional arrow 64.

A spring cushion assembly 66 provides a resilient driving connection between the hub 38 and the disc 44. Disc 44 carries drive pins 68 to which is connected a conventional compression spring retainer 70 for a series of tangentially positioned compression springs 72. Located between each pair of springs 72 is a finger of damper plate 74 which is secured at its hub 76 to the turbine hub 38.

A stationary stator sleeve shaft 78, which is ssecured to the transmission housing, provides a bearing support for the shaft 42. A bushing 80 located between the interior of the sleeve 78 and the shaft 42 provides a suitable bearing point. The sleeve shaft 78 is splined at 82 to the inner race 84 of an overrunning clutch 86 for a bladed stator 88. The clutch includes an outer race 90, which is cammed to provide cooperating clutch surfaces for overrunning clutch rollers 92 situated between the races 90 and 94.

The race 90 is connected to the hub of bladed stator 88 which is formed with an inner race 94 which surrounds the outer extremities of the stator blades 96.

A thrust washer 98 is located between the hub of the stator 88 and the hub of the impeller shell part 14.

An annular fluid flow passage 100 is defined by the sleeve shaft 78 and the turbine shaft 42. That passage communicates with passage 60 through radial ports 102. Fluid pressure from the main regulator valve for the transmission control system, not shown, is distributed from the passage 100 to the passage 60 through the ports 102 and hence to the space 62 which then creates a pressure force acting on the left-hand side of the clutch discs 44 to engage the friction clutch and to establish a driving connection between the turbine and the impeller.

An annular space 104 is provided between the stator sleeve shaft 78 and the surrounding impeller hub 24. This space is connected to a low pressure discharge region of the transmission control system when the clutch is locked up. The space 104 communicates with the interior of the torus circuit of the converter through radial flow passages 106 located in the stator hub.

The turbine shaft 42 is connected to the torque input member 108 of the forward friction clutch 110 of the gear system shown in FIG. 1. The output element 112 of the clutch 110 is connected to an intermediate shaft 114. Clutch discs 116 carried by the output element 112 and cooperating clutch discs 117 carried by the input element 108 can be engaged by clutch piston 120 to establish a driving connection between the turbine shaft 42 and the intermediate shaft 114. Whenever the pressure chamber 122 behind the piston 120 is pressurized, the input element 108 of the clutch 110 is connected to the shaft 114, which is connected to sun gear 132. The output element 119 of the clutch 118 is connected to a first sun gear element 122 of a compound planetary gear set 124. Clutch element 119 defines an annular cylinder in which is situated an annular piston 126, which is adapted to selectively engage clutch discs 128 and 130 connected, respectively, to the clutch element 119 and the clutch element 115. The piston can be pressurized by fluid pressure admitted to the annular pressure chamber behind the piston 126 to connect element 115 to sun gear 122.

Intermediate shaft 114 is connected directly to second sun gear 132. Sun gear 132, which is of smaller diameter than the sun gear 122, engages short planet pinions 134 journalled on carrier 136. Pinions 134 engage long planet pinions 138 which also are journalled on the carrier 136. Carrier 136 is adapted to be anchored against the housing by an overrunning brake 140. Ring gear 142 engages long planet pinions 138.

Carrier 136 is connected to brake drum 144 which is surrounded by low speed ratio brake 146. Brake 146 is engaged during low speed ratio operation and reverse drive operation. During normal operation in the forward drive range in the lowest speed ratio the overrunning brake 140 is used to provide torque reaction rather than brake band 146.

Brake band 152 surrounds a brake drum which is defined by the clutch element 119. Brake band 152 anchors the element 119 and the sun gear 122 to provide a reaction point during the intermediate speed ratio operation.

Ring gear 142 is connected to a driven shaft 148, which in turn is connected to the vehicle traction wheels. A governor 150 is secured to the shaft 148 to provide a speed signal for the automatic control system.

During operation of the lowest speed ratio in the forward drive range, clutch 110 is engaged thereby providing a driving connection between the turbine and the sun gear 132 with carrier acting as a reaction point. The ring gear 142 and the output shaft 148 are driven at the highest torque ratio. To effect a ratio change to the intermediate ratio, brake band 152 is applied thereby anchoring the clutch element 119 and the sun gear 122.

Both brake bands are released and both clutches 110 and 118 are applied to effect a 1:1 driving ratio through the gear system.

Reverse drive is achieved by engaging clutch 118, disengaging clutch 110 and applying brake band 146. Driving torque then is delivered to sun gear 122; and with the carrier acting as a reaction point, ring gear 142 and the output shaft 148 are driven in a reverse direction.

Figure 2B:
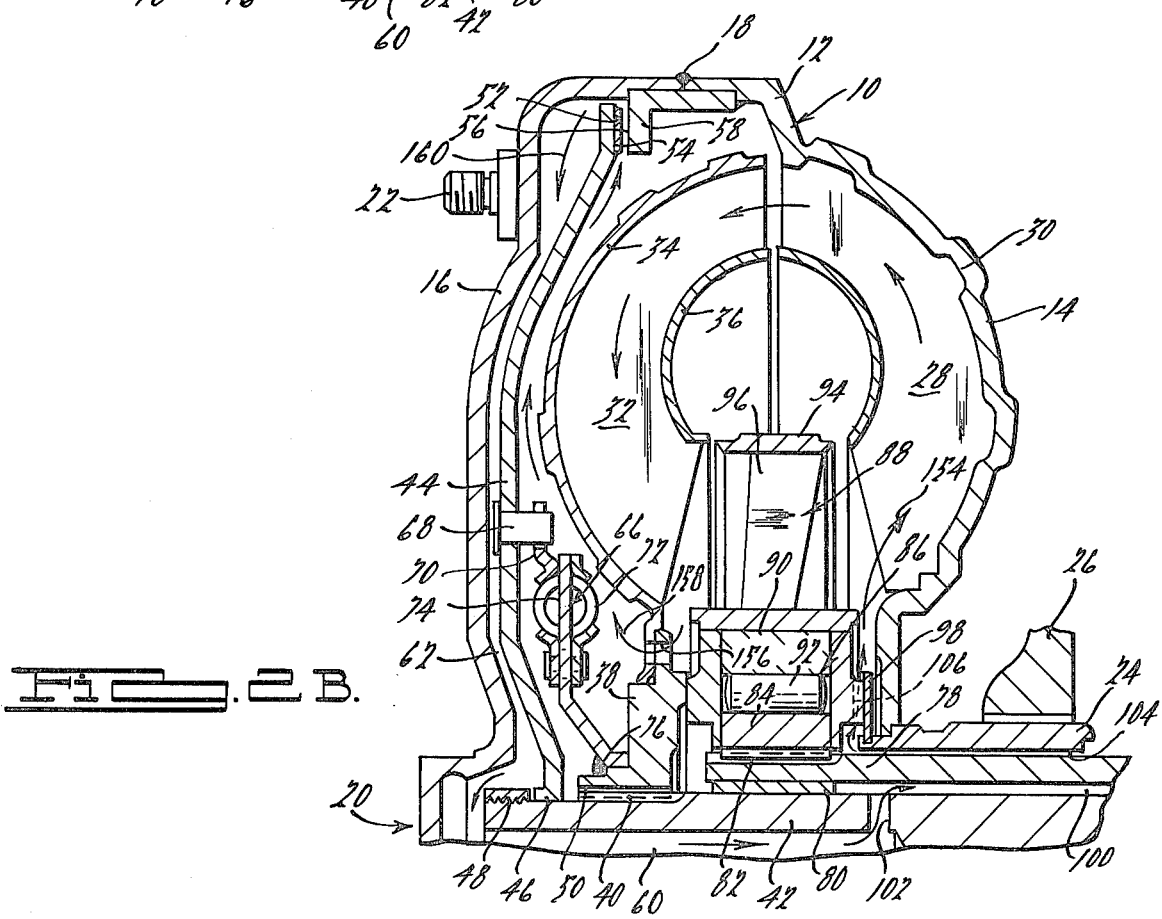
FIG. 2B is a view similar to FIG. 2A, but it shows the lock-up clutch in an unlocked condition.

In FIG. 2B I have shown the converter clutch in the unlocked position. At this time passage 100 is connected to a low pressure discharge port in the control system and passage 104 is connected to the relatively high pressure port for the main regulator valve. The function of passages 100 and 104 thus is reversed. Fluid flows through the passage 104 and in a radially outward direction as shown by vector 154 to feed the torus circuit of the converter. Fluid then passes through transverse ports 156 located in the hub 38 of the turbine as shown by vector 158. The fluid then passes radially outwardly through the space located between the outer side of the turbine shroud 34 and the clutch disc 44 and across the friction surfaces of the clutch. Fluid then is returned in a radially inward direction as shown by vector 160 through the cavity 62, which communicates with passages 60 and 100. Circulation of fluid through the torus circuit and through the friction clutch circuit is not impeded as in the case of prior art systems like that shown in U.S. Pat. No. 3,252,352, since the centrifugal head developed by reason of the rotation of the converter assembly assists the flow rather than providing a flow resistance. Improved cooling thus is achieved with the converter in the unlocked position. The same centrifugal head tends to keep the clutch disengaged thus avoiding unscheduled clutch engagement under certain driving conditions.

Having thus described a preferred embodiment of my invention what I claim and desire to secure by U.S. Letters Patent is:

1. In a hydrokinetic unit having an impeller and a turbine located in toroidal fluid flow relationship, a rotating impeller housing defining a closed fluid cavity, said housing having secured thereto impeller blades that partly define flow passages, and a turbine located in said cavity, said turbine having bladed flow passages that cooperate in toroidal fluid flow relationship with the impeller flow passages; the improvement comprising a clutch disc situated between one side of said impeller housing and defining with said turbine and said impeller housing a radial fluid inflow passage, a friction element carried by said impeller housing having a first friction surface located at a radially outward position in said impeller housing, said clutch disc having a second friction surface thereon that is adapted to register with said first friction surface, said friction surface defining therebetween a radial outflow passage through which fluid in said cavity passes to said radial inflow passage, a first torus flow passage communicating with the interior of the torus circuit of said hydrokinetic unit and a second torus flow passage communicating with said radial inflow passage, a fluid cavity defined in part by said clutch disc adjacent said turbine being in fluid communication with the interior of said torus circuit.

2. In a hydrokinetic torque transmitting unit comprising a bladed impeller and a bladed turbine situated in a torus circuit in fluid flow relationship, said impeller having an impeller housing that contains said impeller and said turbine; the improvement comprising a clutch disc in said housing adjacent said turbine and cooperating with said turbine and said housing to define two radial flow cavities, a first friction surface on the side of said clutch disc facing said turbine, a second friction surface formed on a radially outward portion of said impeller housing and adapted to register with said first friction surface on said clutch disc, first fluid passage means communicating with the radial flow cavity located between said clutch disc and said housing and the interior of said torus circuit communicating with the radial flow passage between said turbine and said clutch disc, and second fluid passage means communicating with said torus circuit, said clutch being engaged by pressure in said first mentioned radial flow cavity when said first passage means is pressurized and said second passage means is depressurized.

3. The combination as set forth in claim 1 wherein said turbine has a hub, a turbine shaft drivably connected to said hub, said hub having formed therein fluid passages connecting the interior of said torus circuit with a radial flow cavity located between said clutch disc and said turbine.

4. The combination as set forth in claim 2 wherein said turbine has a hub, a turbine shaft drivably connected to said hub, said hub having formed therein fluid passages connecting the interior of said torus circuit with the radial flow cavity located between said clutch disc and said turbine.

5. The combination as set forth in claim 3 wherein said turbine hub is connected to said turbine shaft and a mechanical spring cushion connection between said turbine shaft and said clutch disc which is adapted to cushion torsional vibrations during torque delivery through said torque delivery unit with said clutch disc in an engaged condition.

6. The combination as set forth in claim 4 wherein said turbine hub is connected to said turbine shaft and a mechanical spring cushion connection between said turbine shaft and said clutch disc which is adapted to cushion torsional vibrations during torque delivery through said torque delivery unit with said clutch disc in an engaged condition.

* * * * *